United States Patent [19]

Merz et al.

[11] Patent Number: 4,692,880
[45] Date of Patent: Sep. 8, 1987

[54] MEMORY EFFICIENT CELL TEXTURING FOR ADVANCED VIDEO OBJECT GENERATOR

[75] Inventors: Donald M. Merz, Ormond Beach; Jimmy E. Chandler, Ponce Inlet; Richard Economy, Ormond Beach, all of Fla.

[73] Assignee: General Electric Company, Philadelphia, Pa.

[21] Appl. No.: 798,313

[22] Filed: Nov. 15, 1985

[51] Int. Cl.[4] .................. G09B 9/00; G09G 1/00; G06F 15/626
[52] U.S. Cl. .................. 364/521; 434/43; 358/104; 340/729; 340/747; 340/703
[58] Field of Search .................. 364/521, 522, 526; 340/724, 725, 728, 729, 731, 747, 703; 434/38, 43; 358/103, 104, 80; 382/49, 52, 54, 55

[56] References Cited

U.S. PATENT DOCUMENTS

| | | | |
|---|---|---|---|
| 3,602,702 | 8/1971 | Warnock | 364/521 X |
| 3,965,289 | 6/1976 | Pugsley | 358/80 X |
| 4,213,252 | 7/1980 | Sullivan et al. | 364/521 X |
| 4,343,037 | 8/1982 | Bolton | 364/521 |
| 4,475,104 | 10/1984 | Shen | 364/521 X |
| 4,494,838 | 1/1985 | Wallquist et al. | 358/52 X |
| 4,498,104 | 2/1985 | Schulz | 382/52 X |
| 4,570,233 | 2/1986 | Yan et al. | 340/747 X |
| 4,580,236 | 4/1986 | Tsujioka et al. | 364/521 X |
| 4,584,572 | 4/1986 | Lambert, III | 340/703 |
| 4,586,038 | 4/1986 | Sims et al. | 340/725 X |
| 4,609,917 | 9/1986 | Shen | 340/747 X |

Primary Examiner—W. B. Perkey
Attorney, Agent, or Firm—Stephen A. Young; Paul Checkovich

[57] ABSTRACT

An improved advanced video object generator with a more efficient cell texturing memory is disclosed. The advanced video object generator includes a data memory for storing cell-by-cell object data for a plurality of objects for retrieval and processing for video display. A vector processor calculates object transformations for translating operator inputs into image orientation control signals for calculating pixel-by-pixel image data. Cell texture address logic determines the memory location to be accessed for retrieval of cell texture data for display. Output logic provides the cell texture data to a span processor which translates the cell texture data into pixel-by-pixel display data for display on a video display device. The disclosed improvement includes at least one data memory hardware map having a plurality of nxn memory locations for storing $n^2$ cell sets of cell texture data. The cell texture output logic reads out two independent $n^2$ cell sets simultaneously which are blended.

8 Claims, 9 Drawing Figures

| CELL MEM ADRS (X, Y) | 0,0 | 1,0 | 2,0 | 3,0 | 4,0 | 5,0 | 0,6 | 7,0 | 8,0 | 9,0 | 10,0 | • | • |
|---|---|---|---|---|---|---|---|---|---|---|---|---|---|
| 0,0 | 1 | 2 | 3 | 4 | 5 | 6 | 7 | 8 | 1 | 2 | 3 | • | • |
| 0,1 | 9 | 10 | 11 | 12 | 13 | 14 | 15 | 16 | 9 | 10 | 11 | • | • |
| 0,2 | 17 | 18 | 19 | 20 | 21 | 22 | 23 | 24 | 17 | 18 | 19 | • | • |
| 0,3 | 25 | 26 | 27 | 28 | 29 | 30 | 31 | 32 | 25 | 26 | 27 | • | • |
| 0,4 | 33 | 34 | 35 | 36 | 37 | 38 | 39 | 40 | 33 | 34 | 35 | • | • |
| 0,5 | 41 | 42 | 43 | 44 | 45 | 46 | 47 | 48 | 41 | 42 | 43 | • | • |
| 0,6 | 49 | 50 | 51 | 52 | 53 | 54 | 55 | 56 | 49 | 50 | 51 | • | • |
| 0,7 | 57 | 58 | 59 | 60 | 61 | 62 | 63 | 64 | 57 | 58 | 59 | • | • |
| 0,8 | 1 | 2 | 3 | 4 | 5 | 6 | 7 | 8 | 1 | 2 | 3 | • | • |
| 0,9 | 9 | 10 | 11 | 12 | 13 | 14 | 15 | 16 | 9 | 10 | 11 | • | • |
| 0,10 | 17 | 18 | 19 | 20 | 21 | 22 | 23 | 24 | 17 | 18 | 19 | • | • |

FIG. 3A FIRST SPAN CLOCK CALCULATION EXAMPLE
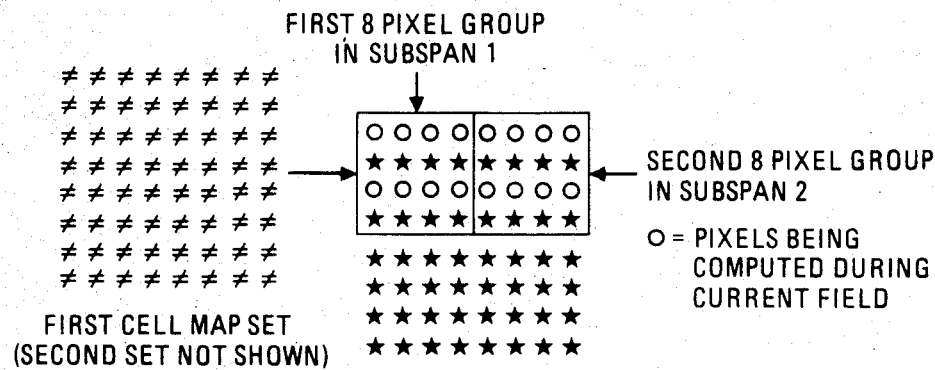
FIG. 3B SECOND SPAN CLOCK CALCULATION EXAMPLE
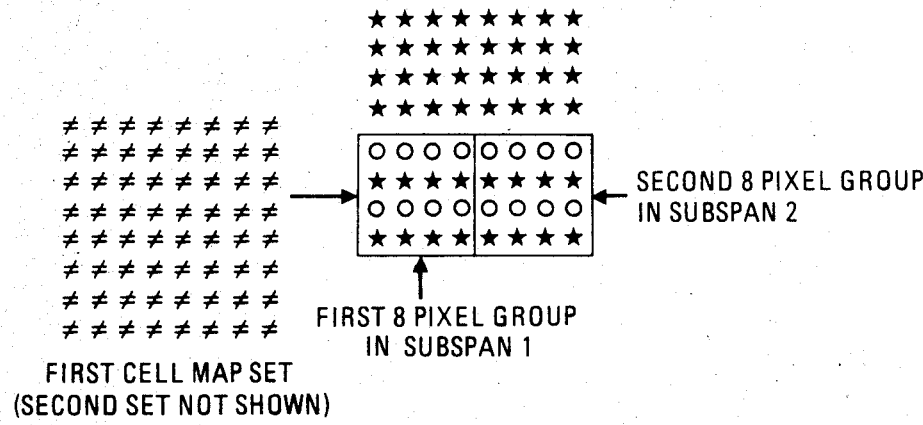
FIG. 5
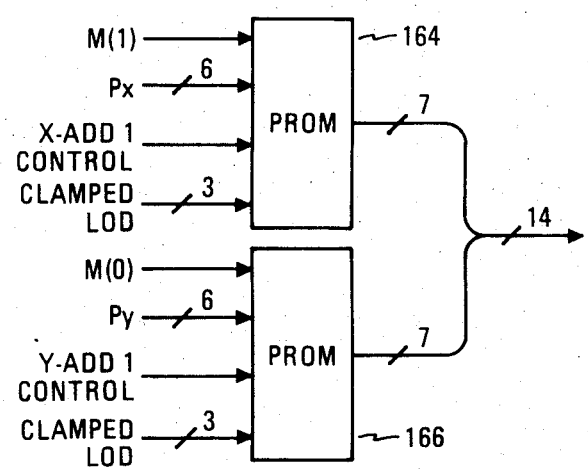

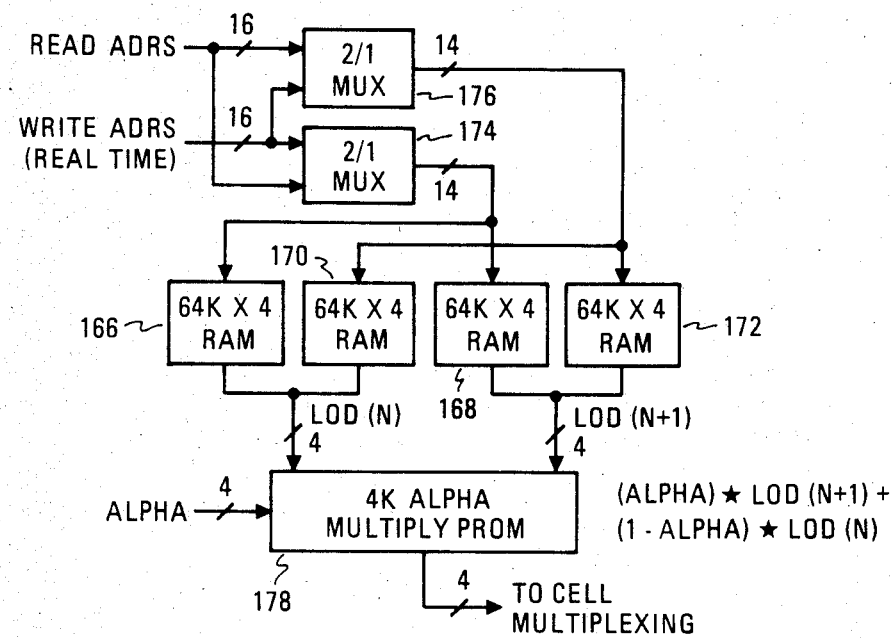
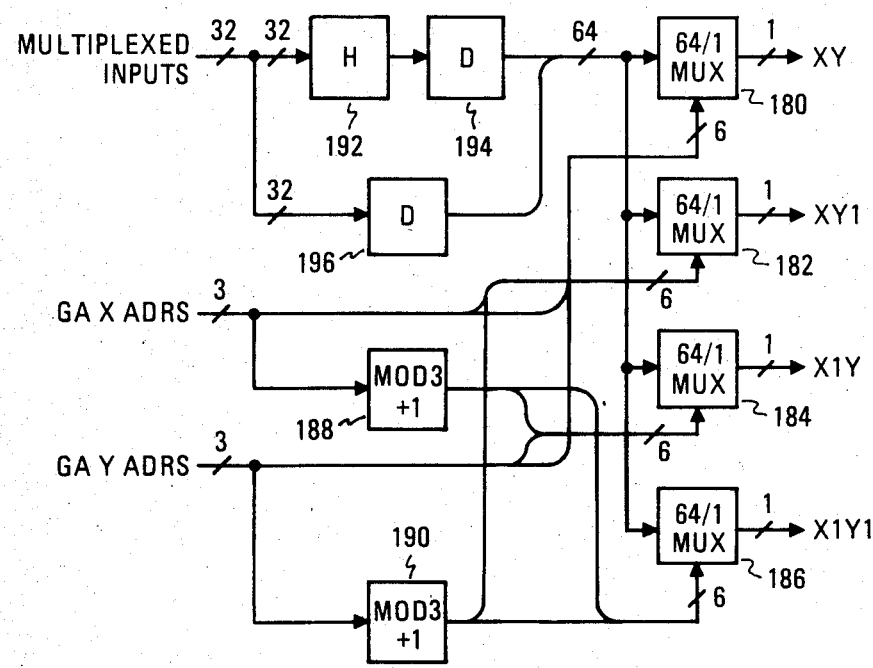

MEMORY EFFICIENT CELL TEXTURING FOR ADVANCED VIDEO OBJECT GENERATOR

CROSS REFERENCE TO RELATED APPLICATION

This application is related in subject matter to copending application Ser. No. 06/527,809 filed August 30, 1983, now abandoned, by Bunker et al and entitled "Advanced Video Object Generator". The Bunker et al application is assigned to a common assignee with this application and is incorporated herein by reference.

FIELD OF THE INVENTION

The present invention generally relates to computer image generator (CIG) systems and, more particularly, to improvements in memory management techniques which allow a significant reduction in the "cell texture" modulation hardware used in the advanced video object generator disclosed in the above referenced Bunker et al application.

DESCRIPTION OF THE PRIOR ART

The principle application for computer image generation (CIG) has been for visual training simulators which present scenes to an observor or trainee to allow the observor to practice some task, such as flying an airplane. In a flight simulator, a three-dimensional model of the desired "gaming area" is prepared and stored on magnetic disk or similar bulk storage media. This model is called the visual data base. The visual simulator combines an image generator with an electro-optical display system such as a cathode ray tube (CRT) or similar display. The image generator reads in blocks of three-dimensional data from the disk and transforms this data into two-dimensional scene descriptions. The two-dimensional data are converted to analog video that is presented to the operator or trainee via the display. The generated imagery is meant to be representative of the true scenes that the operator would see if the operator were actually performing the task being simulated. The generation of the display images is said to be in "real time" which is normally taken to means 30 frames per second, as in the U.S. television standard. CIG systems are described in detail in the book entitled *Computer Image Generation* edited by Bruce J. Schacter and published by Wiley-Interscience (1983).

One prior art system is disclosed in U.S. Pat. No. 4,343,037 issued Aug. 3, 1982, to Bolton. According to the Bolton disclosure, a texture pattern is stored in memory and retrieved for each pixel along each scan line. However, because of limitations of memory size and access times, the level of detail (LOD) which can be handled by the Bolton system is limited. In depicting images of very complex objects, such as trees, the number of edges and texture patterns required to generate a realistic image would be prohibitively large for a real time system constructed in accordance with the Bolton patent.

A solution to this problem was provided in the advanced video object generator disclosed in the above referenced patent application to Bunker et al. The Bunker et al system includes a memory for storing data appplicable to each cell of a surface defining texture patterns of actual objects, translucency code calculation boards, memory for storing a transparency or translucency code and supplying this code on a pixel-by-pixel basis to the image generator, level of detail calculators and level of detail blending, edge-on fading, and texture smoothing for generating images of three dimensional objects for computer image generation. The "cell texture" hardware in the Bunker et al advanced video object generator uses four separate cell memory maps for each parallel pixel path required for the real time image calculation. In a typical real time implementation, as many as sixteen parallel pixel processing paths are required, so that a total of 4×16, or 64 maps are required.

Experiments which have been conducted demonstrate a remarkable increase in cell map resolution if the minimum cell size is allowed to be less than the pixel size. This finding has made it necessary to develop a different and more efficient approach to cell texture memory organization than what has been previously used.

SUMMARY OF THE INVENTION

It is therefore an object of the present invention to provide a memory management technique and hardware arrangement which takes advantage of both the four cell smoothing and the adjacent pixel positioning to allow a significant reduction in hardware map requirements in the advanced video object generator.

While in theory the invention allows only one hardware map to be used, according to a practical implementation of a preferred embodiment of the invention, the actual number of maps used is four, resulting in a 16-to-1 saving. This is significant since the cell maps are a large portion of the cell texture hardware, and becuase of this saving, the invention has allowed the inclusion of many more cell modulation maps than were previously practical. Moreover, the invention eliminates a 256-to-1 multiplexer which would otherwise be required in the previous design. The four hardware maps reduce the multiplexer to a 64-to-1 path.

According to the preferred embodiment of the invention, the memories are arranged to read out two independent 64-cell sets simultaneously. The sets are configured in a 64-cell, 8×8 portion of a 512×512 cell map. Each one of the two sets are allocated to a 4×4 subspan. The sixty-four memory sections of a set are addressable by a single calculated subspan address or that subspan address plus one. Each of the memory sections contain 4K of the 256K total map cells at the most detailed level. The addressing for each section skips every eight cell locations. In general, a subspan may be positioned in any orientation across an 8×8 cell memory set.

BRIEF DESCRIPTION OF THE DRAWINGS

The foregoing and other objects, aspects and advantages of the invention will be better understood from the following detailed description of a preferred embodiment of the invention with reference to the accompanying drawings, in which:

FIGS. 3A and 3B are memory maps showing cell memory set allocations in a specific preferred embodiment of the invention;

FIG. 5 is a block diagram showing memory map addressing control;

FIG. 6 is a block diagram showing a map memory board section; and

FIG. 7 is a block diagram showing a multiplexer array.

DETAILED DESCRIPTION OF A PREFERRED EMBODIMENT OF THE INVENTION

A brief review of cell texturing as practiced in the advanced video object generator disclosed in the above referenced Bunker et al application is provided here to place the present invention in its proper environment.

Generally, any point on a defined surface in three dimensional space can be specified by the values to two parameters. On a planar surface, these parameters are labeled x,y corresponding to cartesian coordinates; on a cylindrical surface, they are labeled $z,\theta$ corresponding to cylindrical coordinates; and on a spherical surface, they are labeled $\theta,\phi$, corresponding to spherical coordinates. In the following discussion, $Q_1$ and $Q_2$ are used as generic parameter designations. Base color or modulation information can be considered as functions of $Q_1$ and $Q_2$. In one mode of operation of cell texture, the values of $Q_1$ and $Q_2$ corresponding to the center of each pixel are determined, the modulation or color information designated by the $Q_1, Q_2$ is extracted from a computer memory previously loaded with the modulation or color information for each face of a set of objects to be shown on a video display, and these values are used to determine or modify the pixel video. The memory contents can be determined by some algorithm applied to the $Q_1, Q_2$ values on the image of an object to be loaded into memory, by digitizing photographs of features of regions to be represented, or by some combination of these techniques. The results of these image describing techniques are then stored in memory for retrieval and use in computer image generation. The treatment of object images in this way for computer image generation (CIG) is called cell texturing.

The mathematics to determine the strikepoint of a view ray on a parametrically defined curved surface is sufficiently complex that large amounts of hardware are required to apply cell texture to such surfaces in real time systems. For planar surfaces, the values of Q expressed in terms of view window location I,J is in the form given below:

$$Q = P_0 + \frac{C1 + C2\Delta I + C3\Delta J}{C4 + C5\Delta I + C6\Delta J} \quad (1)$$

where $P_0$ and $C_1$ to $C_6$ are supplied from the vector processor, which generates the values of the coefficients for mapping video information from cells onto pixels on the scene to be displayed. $P_0$ is the reference value which, in combination with $C_1$ to $C_6$, determines the location on a face struck by a ray through pixel I,J. The numerator and denominator of the quotient in equation (1) are each linear in I and J and hence easily updated by incrementing. This still leaves the rather formidable task of obtaining the high precision quotient for each pixel or subpixel.

Figure 1A:
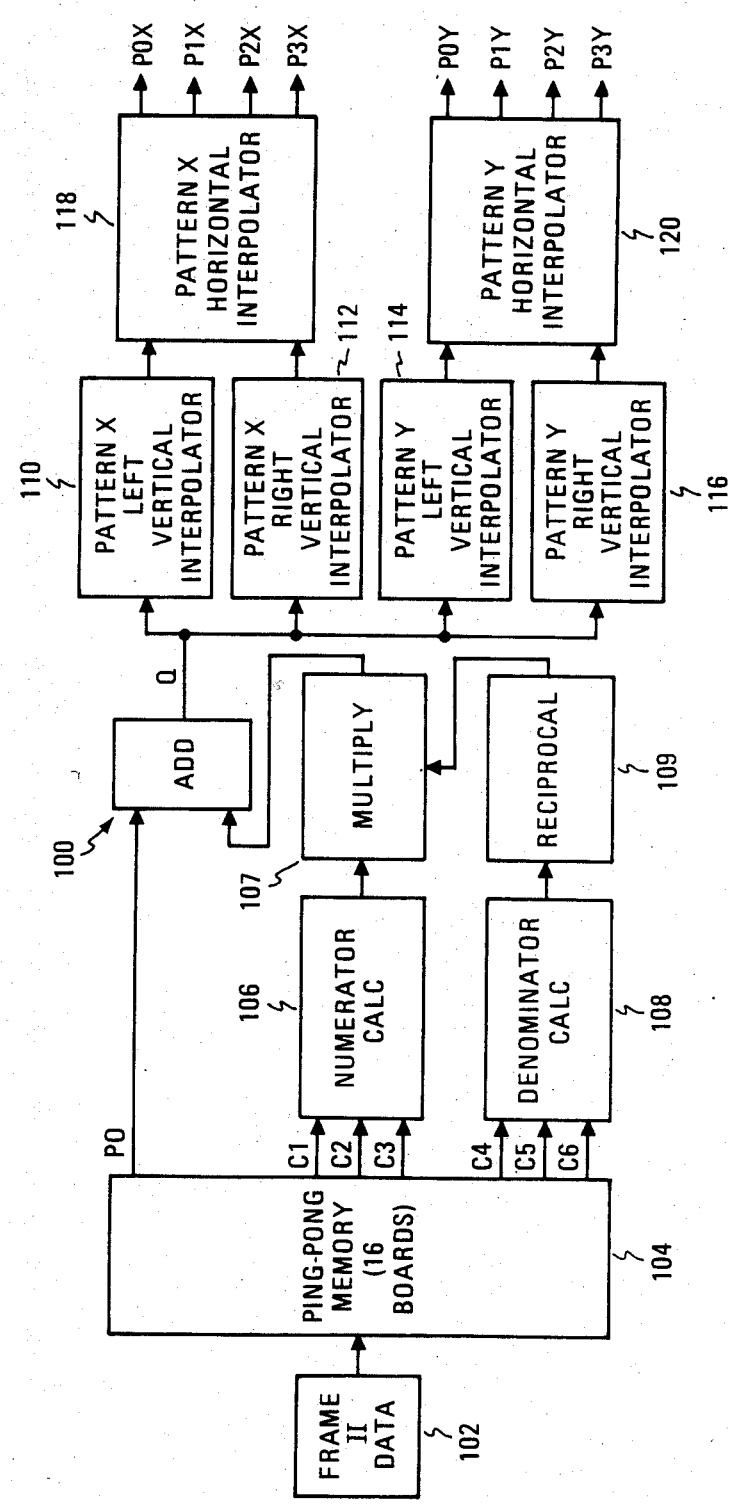
FIGS. 1A and 1B, taken together, are a functional block diagram illustrating the advanced video object generator according to the Bunker et al invention.
Figure 1B:
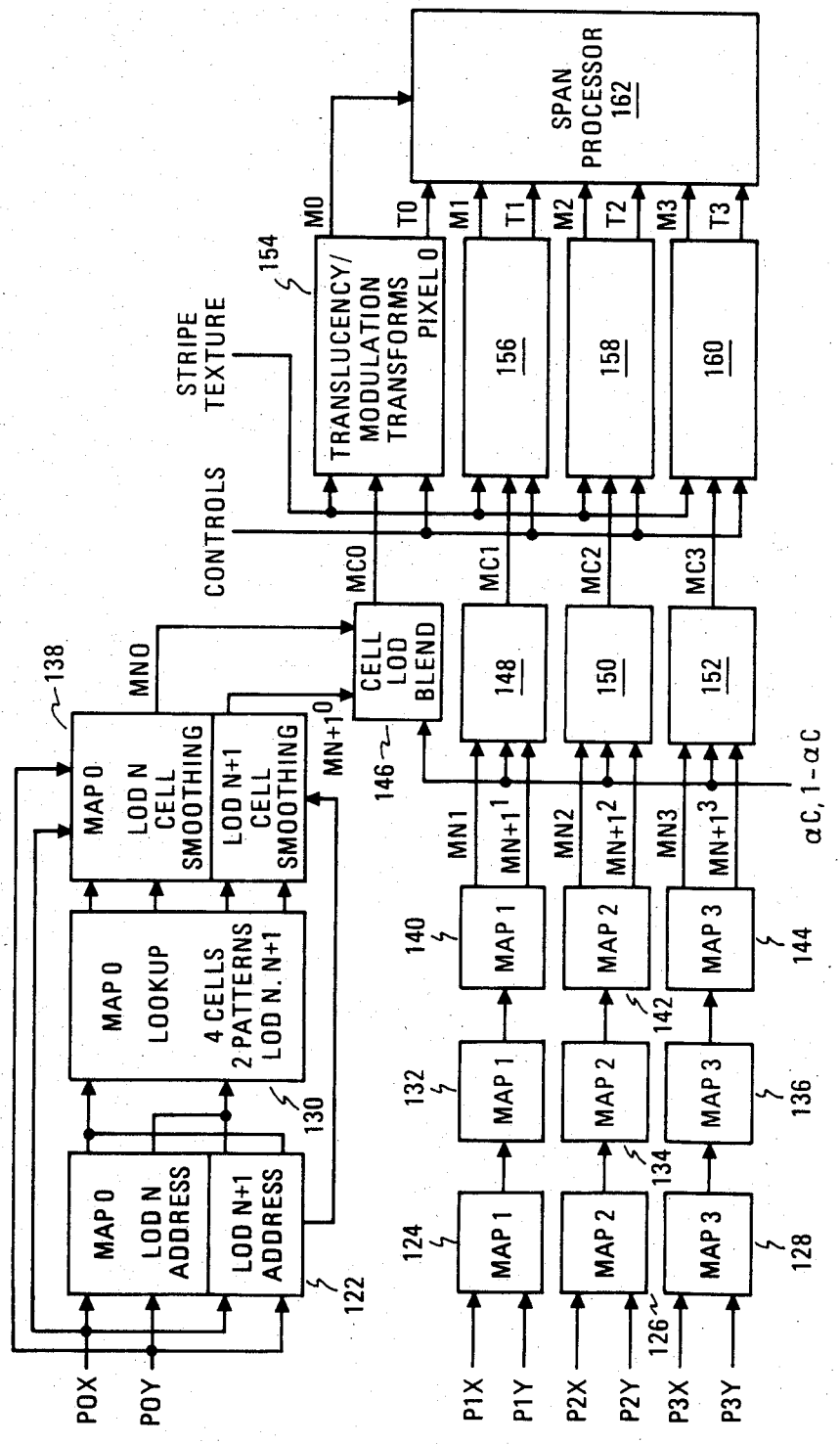

A block diagram of the advanced video object generator as disclosed in the above referenced Bunker et al application is shown in FIGS. 1A and 1B, to which reference is now made. Image data are input from vector processor 102, and operator inputs are provided from the user controls (not shown). The image data contain color and texture information for each object face in the scene to be displayed. The input data is received in input memories 104 for feeding to the advanced video object generator 100. The memories 104 are double buffered in the digital data base so that the current field's data may be read out while the next field's data is being loaded. The input memories 104 are made with sufficient depth to hold all face data which may appear in one channel in a given field. The conventional vector calculations which transform the pattern coefficients of the faces in a scene to the correct three dimensional perspective for the observer's view point are performed by the vector processor 102 and supplied to the advanced object generator 100. The view point and operator control inputs are used to determine which object images are to be processed for display upon a particular video display.

The value of Q defined in equation (1) is calculated in blocks 106 to 109. After the Q values for each span of a video scene are calculated, a bilinear interpolation is used to determine Q values for each individual pixel. The bilinear interpolation is performed by the combination of vertical interpolators 110, 112, 114, and 116 and horizontal interpolators 118 and 120. The outputs from the horizontal interpolators are input to the cell map address generators 122, 124, 126, and 128 which calculate map addresses for accessing the cell texture maps 130, 132, 134 and 136. The cell texture maps contain cell texture data for each cell of the image. The X and Y Q values are combined to form the map address for each of the four cells whose centers form a polygon surrounding the pixel center. The cell map shape can be selected to be 1024×64 cells, 512×512 cells or 256×256 cells with face control flags. Each map shape requires 64K memory data storage. Four copies of the map are required to perform cell smoothing. The map LODs are used to control the map cell size relative to the display pixel size regardless of the view ray distance to the scene feature. Each different LOD map copy is mathematically generated by filtering the more detailed copy into a quarter size smaller map. Thus, a 256×256 map will become 128×128 and then a 64×64 and so forth size map as view distance to the feature increases.

A total of 86K memory locations are required in the LOD cell memories 130, 132, 134, and 136 to store all the different LOD versions of the maps. The map storage is arranged so that the N and N+1 LOD map versions are available simultaneously to accomplish a smooth LOD transition between the two levels. The determination of which LOD to use is made by monitoring both the X and Y pattern gradients in the view plane. This is controlled by floating point subtraction hardware in the base number calculators 106 to 109. The worst case pattern change floating point exponent selects which N and N+1 map LODs to use.

The outputs from the cell memories 130, 132, 134, and 136 are supplied to the cell smoothing blocks 138, 140, 142, and 144. The cell smoothing blocks also receive inputs from the horizontal interpolators which are used to calculate the proportion of intensity input from the four cells surrounding a given pixel. This calculation provides a coefficient for each of the cell intensities for controlling the pixel intensity.

The four adjacent cells surrounding a view pixel are read from memory and blended in cell smoothing blocks 138, 140, 142, and 144 according to the following equation:

$$M = Mxy * (1 - f(x)) * (1 - f(y)) + \qquad (2)$$

$$Mxy1 * (1 - f(x)) * (f(y)) +$$

$$Mx1y * (f(x)) * (1 - f(y)) +$$

$$Mx1y1 * (f(x)) * (f(y))$$

where Mxy, Mxy1, Mx1y, and Mx1y1 are the cell memory contents for the four cells surrounding the view pixel. Each of the f numbers refers to the fractional bits of the Q number which remain after the LOD addressing shift. These bits are a direct indication of the distances of the center of a view pixel to the centers of the the four surrounding cells. Logic is included in the blending hardware to control the cell smoothing at each of the four edges of the cell map. Each of the LOD N and LOD N+1 maps must be blended with separate hardware. After the cell smoothing, the two different LOD modulations are blended together. This LOD blending is performed in blocks 146, 148, 150, and 152. Fractional gradient bits are used to form an alpha LOD blend coefficient to combine the two LOD map versions according to the following equation:

$$M = \alpha * M(N+1) + (1-\alpha) * M(N) \qquad (3)$$

At this point, the cell texture calculations have been completed. The cell texture value is now transformed to control face translucency as well as to modulate the face color by the translucency/modulation blocks 154, 156, 158, and 160. The outputs from the translucency/modulation blocks are fed to the span processor 162 to control the image being generated.

Figures 2, 4:
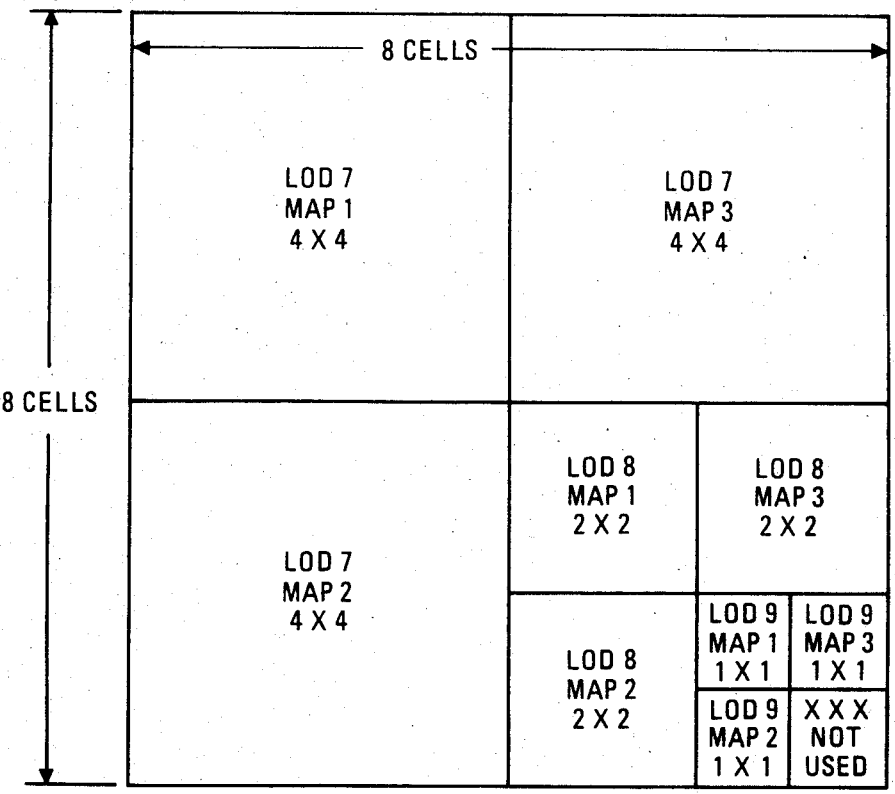
FIGS. 2 is a memory map illustrating the basic principles of operation according to the present invention.
FIG. 4 is a memory map showing level of detai (LOD) 7,8 and 9 memory layout arrangement.

According to the present invention, the memories 130, 132, 134, and 136 are arranged to read out two independent sixty-four cell sets simultaneously. The sets are configured in a 64-cell, 8×8 portion of a 512×512 cell map. Each one of the two sets is allocated to a 4×4 subspan. The sixty-four memory sections of a set are addressable by a single calculated subspan address or that subspan address plus one. Each of the memory sections contains 4K of the 256K total map cells at the most detailed level. The addressing for each section skips every eigth cell location as illustrated by FIG. 2. Each memory section in FIG. 2 is labeled from 1 to 64. Memory section 1 is outlined to illustrate the cell data location which would be stored in a particular memory section. The at least one data memory hardware map has a plurality of n×n memory locations for storing $n^2$ cell sets of cell texture data. The cell texture output logic reads out two independent $n^2$ cell sets simultaneously which are blended. Each of the two independent $n^2$ cell sets are indicative of corresponding object data at respectively different levels of detail.

The allocation of the cell memory sets to the subspan groups is illustrated in FIGS. 3A and 3B. Each of two independent $n^2$ cell sets are allocated to an n/2×n/2 subspan and the memory locations of an n×n cell set are addressed by a single subspan address or that subspan address plus one. One memory set is allocated to eight pixels of a sixteen pixel calculation path. Three maps are packed into 16K words of memory. The memory is arranged so that sixty-four cell sections may be read out simultaneously in an 8×8 matrix. The total space required for the three maps is exactly 16K if the final LODs of each of the three maps are arranged in the 8×8 readout matrix shown in FIG. 4. The total map storage required for each LOD level is set out in Table 1:

TABLE 1

| LOD | Size | 64 Cells Sections Req'd |
|---|---|---|
| 0 | 512 × 512 | 4096 |
| 1 | 256 × 256 | 1024 |
| 2 | 128 × 128 | 256 |
| 3 | 64 × 64 | 64 |
| 4 | 32 × 32 | 16 |
| 5 | 16 × 16 | 4 |
| 6 | 8 × 8 | 1 |
| 7 | 4 × 4 |  |
| 8 | 2 × 2 | ¼ |
| 9 | 1 × 1 |  |
|  |  | 5461¼ |

The required LOD addressing for the 16K section of memory for each LOD access level is set out in Table 2:

TABLE 2

| ADRS BIT | LOD(0) | LOD(1) | LOD(2) | LOD(3) | LOD(4) | LOD(5) | LOD(6) | LOD(7,8,9) |
|---|---|---|---|---|---|---|---|---|
| A(13) | MS(1) | 1 | 1 | 1 | 1 | 1 | 1 | 1 |
| A(12) | Px(−1) | MS(1) | 1 | 1 | 1 | 1 | 1 | 1 |
| A(11) | Px(−2) | Px(−1) | MS(1) | 1 | 1 | 1 | 1 | 1 |
| A(10) | Px(−3) | Px(−2) | Px(−1) | MS(1) | 1 | 1 | 1 | 1 |
| A(9) | Px(−4) | Px(−3) | Px(−2) | Px(−1) | MS(1) | 1 | 1 | 1 |
| A(8) | Px(−5) | Px(−4) | Px(−3) | Px(−2) | Px(−1) | MS(1) | 1 | 1 |
| A(7) | Px(−6) | Px(−5) | Px(−4) | Px(−3) | Px(−2) | Px(−1) | MS(1) | 1 |
| A(6) | MS(0) | 1 | 1 | 1 | 1 | 1 | 1 | 1 |
| A(5) | Py(−1) | MS(0) | 1 | 1 | 1 | 1 | 1 | 1 |
| A(4) | Py(−2) | Py(−1) | MS(0) | 1 | 1 | 1 | 1 | 1 |
| A(3) | Py(−3) | Py(−2) | Py(−1) | MS(0) | 1 | 1 | 1 |  |
| A(2) | Py(−4) | Py(−3) | Py(−2) | Py(−1) | MS(0) | 1 | 1 | 1 |
| A(1) | Py(−5) | Py(−4) | Py(−3) | Py(−2) | Py(−1) | MS(0) | 1 | 1 |
| A(0) | Py(−6) | Py(−5) | Py(−4) | Py(−3) | Py(−2) | Py(−1) | MS(0) | 1 |

MS(1) and MS(0) in table 2 refer to the two map select bits which are required to select the 1-of-3 stored cell maps.

In general, a subspan will be positioned in any orientation across a 8×8 cell memory set. The LOD control limits the subspan size to be less than the cell sets. Addressing each cell memory section of the set is accomplished with the map addressing control shown in FIG. 5 and the following procedure. In order to develop the basic subspan X,Y memory address, first the X,Y memory address is adjusted at each subspan corner pixel with a −0.5 subtract from the address bits (taking into consideration the LOD shift calculation to follow). Next, the integer X,Y memory address bits (based upon the current LOD) are compared at each corner of the 4×4 subspan, and the smallest value of both the X and Y component are selected. The six most significant bits (MSBs) of the X and Y addresses are used as the basic subspan address and are routed to the memory addressing programmable read only memories (PROMs) 164 and 166. The three remaining least significant bits (LSBs) after an LOD shift adjustment determine which memory sections receive the basic subspan address X,Y or the basic subspan address plus 1 (X+1 or Y+1). For example, if the X offset is one, then memory sections 1, 9, 17, 25, 33, 41, 49, and 57 would get the X+1 address. If the Y offset is one, then memory sections 1, 2, 3, 4, 5, 6, 7, and 8 would get the Y+1 address.

Static memory integrated circuits (ICs) can be used for the cell map memory sections, as shown in FIG. 6. The two memory pairs 166, 168 and 170, 172 are set up with different address select multiplexers 174 and 176, respectively, so that twelve cell maps can be updated in real time while the other twelve maps are being read out.

The second memory 168 and 172 in each section provides the second LOD level. This memory is addressed at the same address as the first LOD level. It has just as many words as the first section but each word contains the second LOD interpolated at the first Q address. A 4K PROM 178 provides LOD blending on the memory board. This on board blending reduces the board output input/output (I/O) and multiplexing logic by one half.

The above addressing technique provides the basic address for the 8×8 cell set but leaves the job of multiplexing the desired four cell cluster for each pixel's smoothing hardware. This multiplexing must be performed for each of the sixteen parallel pixel processing paths. Each of the cells of the four cell cluster requires four 64-to-1 multiplexers to both remove the offset introduced by the basic 8×8 set address and to select the correct cell position required by the address of the particular pixel path being computed.

The multiplexer control is shown in FIG. 7 and first starts with the X and Y Q address of the pixel path being calculated. The X and Y address must be modified with the -0.5 subtract from the address bits and then be shifted by the LOD number. The multiplexers 180, 182, 184, and 186 can then be controlled by the three LSBs of the shifted X,Y address for the LODs 0 through 9. The map address is also required to control the special case of LODs 7 through 9. If the original 8×8 cell layout is specified as columns 0 through 7 on the X axis and as rows 0 through 7 on the Y axis, then the basic multiplexer address can be defined as follows:

X column address = 3 LSBs of X pixel address

Y row address = 3 LSBs of Y pixel address

These addresses select the XY cell location. The XY1, X1Y, and X1Y1 multiplexer addresses are obtained by selectively adding one (modulo 3) to the above derived addresses in adders 188 and 190. This basic control is modified for the special case of the LODs 7, 8 and 9. Registers 192, 194 and 196 are used to demultiplex the 32-bit data input bus to sixty-four signals. Register 192 stores the first thirty-two bits and then transfers its contents to register 194 while the second thirty-two bits are read into register 196. The outputs of registers 194 and 196 provide the sixty-four input signals to the multiplexers 180, 182, 184, and 186.

While the invention has been described with reference to a single preferred embodiment, those skilled in the art will recognize that, in practice, this embodiment is exemplary and may be modified without departing from the scope or spirit of the invention as defined in the appended claims.

We claim:

1. An improved advanced video object generator including data memory means for storing cell-by-cell object data for a plurality of objects for retrieval and processing for video display, vector processing means for calculating object transformations for translating operator inputs into image orientation control signals for calculating pixel-bypixel image data, cell texture address means for determining the memory location to be accessed for retrieval of cell texture data for display, cell texture output means for outputting said cell texture data, span processing means for translating said cell texture data into pixel-by pixel display data, and video monitor means for displaying images of objects comprising pixel-by-pixel displays of said display data, the improvement comprising:

at least one memory hardware map coupled to said data memory means, said at least one memory map having a plurality of n×n memory locations for storing $n^2$ cell sets of cell texture data;

means for reading out two independent $n^2$ cell sets simultaneously coupled to said cell texture output means, each of the two independent $n^2$ cell sets indicative of corresponding object data at respectively different levels of detail;

means for blending the data in said two independent $n^2$ cell sets, the means for blending coupled to the means for reading out two independent $n^2$ cell sets;

wherein each of said two independent $n^2$ cell sets are allocated to a respective subspan at the respective levels of detail for simultaneously obtaining data for a plurality of pixel calculation paths, said cell texture address means including means for addressing the memory locations of an n×n cell set by a single subspan address or the single subspan address plus one.

2. A method for retrieving data for cell texturing an image to be displayed, the image formed from a plurality of pixels and the data oriented in a cell map, wherein the cell map includes a plurality of cell sets, each cell set having a respective plurality of cell memory sections, comprising:

allocating a cell set to a subspan, wherein the subspan inludes a plurality of members arranged in a square array, each of the members corresponding to a respective predetermined one of the plurality of pixels and further wherein the address of the subspan is the address of a predetermined corner of the array;

limiting the size of the subspan to less than the size of the allocated cell set;

calculating the address of the subspan wherein the address of the subspan is in the form of an X, Y coordinate pair;

determining the contents of the respective cell memory sections surrounding the center of the respective corresponding member of the subspan; and modulating the color of the respective predetermined one of the plurality of pixels in response to the contents of the respective cell memory sections surrounding the respective corresponding member, wherein data for each of the respective predetermined one of the plurality of pixels is simultaneously obtained from the cell map.

3. The method as in claim 2, wherein the cell set is an n×n array and the subspan is an n/2×n/2 array.

4. The method as in claim 3, wherein the address of the predetermined corner includes the smallest value of both X and Y for the corners of the array.

5. The method as in claim 4, wherein the cell memory sections of the one of the cell sets are addressable by the X, Y coordinate pair, an (X+1), Y coordinate pair an X, (Y+1) coordinate pair, or an (X+1, (Y +1) coordinate pair.

6. The method as in claim 2, wherein the respective cell memory sections surrounding the members include the four adjacent memory sections surrounding each respective member.

7. A method for retrieving data for texturing an image to be displayed, the data indicative of color and oriented in a plurality of cell maps corresponding to respective levels of detail, each cell map including a plurality of cell sets having a respective plurality of cell memory sections, comprising:

allocating cell sets of a cell map having a first predetermined level of detail to a first subspan, wherein the first subspan includes a plurality of first members, each of the plurality of first members corresponding to a respective predetermined one of the plurality of pixels;

allocating cell sets of a cell map having a second predetermined level of detail to a second subspan, wherein the second subspan includes a plurality of second members, each of the plurality of second members corresponding to one of the respective predetermined one of the plurality of pixels;

limiting the size of the first and second subspan to less than the size of the respective allocated all sets;

calculating the address of the first and second subspan wherein the address of the first and second subspan is in the form of a respective X, Y coordinate pair; and determining the contents of the respective cell memory sections surrounding the centers of the respective corresponding first and second members of the first and second subspan, respectively; and controlling each of the respective predetermined one of the plurality of pixels in response to the contents of the respective cell memory sections surrounding the center of the corresponding one of the plurality of first and second members, wherein data for each of the respective predetermined one of the plurality of pixels is simultaneously obtained from the cell maps having the first and second predetermined level of detail.

8. The method as in claim 7, wherein the step of controlling further includes blending the contents of the respective cell memory sections surrounding the respective corresponding one of the plurality of first and second members.

* * * * *